(12) United States Patent
Crow (10) Patent No.: US 8,991,112 B2
(45) Date of Patent: *Mar. 31, 2015

(54) IN-GROUND STORM SHELTER

(71) Applicant: Richard Crow, Perry, OK (US)

(72) Inventor: Richard Crow, Perry, OK (US)

(\*) Notice: Subject to any disclaimer, the term of this patent is extended or adjusted under 35 U.S.C. 154(b) by 0 days.

This patent is subject to a terminal disclaimer.

(21) Appl. No.: 13/970,581

(22) Filed: Aug. 19, 2013

(65) Prior Publication Data

US 2013/0333309 A1 Dec. 19, 2013

Related U.S. Application Data

(63) Continuation of application No. 13/470,330, filed on May 13, 2012, now Pat. No. 8,511,005, which is a continuation of application No. 13/051,209, filed on Mar. 18, 2011, now Pat. No. 8,176,692.

(60) Provisional application No. 61/345,457, filed on May 17, 2010.

(51) Int. Cl.
| | | |
|---|---|---|
| *E04B 1/00* | (2006.01) | |
| *E04H 9/14* | (2006.01) | |
| *E04H 9/06* | (2006.01) | |

(52) U.S. Cl.
CPC ... *E04H 9/14* (2013.01); *E04H 9/06* (2013.01)
USPC ........................................... 52/169.6

(58) Field of Classification Search
CPC ........... E04H 9/14; E04H 9/12; E04H 1/1277; E04H 9/04; E04H 9/06
USPC ........... 52/19, 20, 79.1, 169.6, 207; 292/137, 292/163, 164, 174
See application file for complete search history.

(56) References Cited

U.S. PATENT DOCUMENTS

| | | | | |
|---|---|---|---|---|
| 1,689,101 | A  * | 10/1928 | Beck ............................. | 292/175 |
| 4,099,356 | A  * | 7/1978 | Graham ......................... | 52/520 |
| 6,120,070 | A  * | 9/2000 | Myers ............................ | 292/163 |
| 6,161,345 | A  * | 12/2000 | Hope et al. .................... | 52/169.6 |
| 6,708,625 | B1 * | 3/2004 | Burke et al. ................... | 105/355 |
| 6,772,566 | B1 * | 8/2004 | Machledt et al. ............. | 52/169.6 |
| 7,428,800 | B1 * | 9/2008 | Vaughn et al. ................. | 52/19 |
| 7,690,159 | B1 * | 4/2010 | Arnold ......................... | 52/167.1 |
| 7,891,031 | B2 * | 2/2011 | Khalaf et al. .................. | 4/498 |
| 2001/0039770 | A1 * | 11/2001 | Arnold ......................... | 52/169.6 |
| 2003/0167708 | A1 * | 9/2003 | Shaw et al. ................... | 52/169.6 |
| 2008/0016611 | A1 * | 1/2008 | Khalaf et al. .................. | 4/498 |
| 2010/0043309 | A1 * | 2/2010 | Martin et al. .................. | 52/79.5 |

\* cited by examiner

*Primary Examiner* — Brian Glessner
*Assistant Examiner* — Brian D Mattei
(74) *Attorney, Agent, or Firm* — Martin S. High, P.C.

(57) ABSTRACT

In areas with propensity for tornados, for example in the central part of the country, the plain states, the mid-west, and also in Florida, it is customary to have some form of storm shelter in which the occupants of commercial and residential buildings can seek refuge in the event of a tornado. The safest type of storm shelter is a so-called in-ground storm shelter. The embodiments of the In-Ground Storm Shelter are comprised of a bottom, a left side and a right side. The In-Ground Storm Shelter is further comprised of a front side and a back side, and a top side. The top side is further comprised of a removable back door, a sliding door, a top left shoulder and a top right shoulder.

16 Claims, 8 Drawing Sheets

IN-GROUND STORM SHELTER

CROSS-REFERENCE TO RELATED APPLICATIONS

This application is a continuing application of U.S. non-provisional patent application with Ser. No. 13/470,330 titled "IN-GROUND STORM SHELTER" filed on May 13, 2012. This application claims priority of U.S. Non-Provisional patent application with Ser. No. 13/470,330. U.S. non-provisional patent application Ser. No. 13/470,330 in turn was a continuation of and claimed priority of non-provisional patent application with Ser. No. 13/051,209 of the same title filed on Mar. 18, 2011. This application claims priority of U.S. non-provisional patent application with Ser. No. 13/051,209. U.S. non-provisional application Ser. No. 13/051,209 in turn claims priority of U.S. provisional patent application with Ser. No. 61/345,457 of the same title filed on May 17, 2010. The entire contents of U.S. provisional patent application with Ser. No. 61/345,457, U.S. non-provisional patent application with Ser. No. 13/051,209, and U.S. non-provisional patent application with Ser. No. 13/470,330 are herein incorporated by reference.

STATEMENT REGARDING FEDERALLY SPONSORED RESEARCH OR DEVELOPMENT

Not applicable

FIELD OF THE EMBODIMENTS

The field of the embodiments is generally in the area of storm shelters. More specifically the field of the embodiments described herein is in the area of in-ground storm shelters.

BACKGROUND OF THE EMBODIMENTS

The background of the embodiments of the in-ground storm shelter comprises construction and use of in-ground storm shelters. In areas with propensity for tornados, for example in the central part of the country, the plain states, the mid-west, and also in Florida, it is customary to have some form of storm shelter in which the occupants of commercial and residential buildings can seek refuge in the event of a tornado. The safest type of storm shelter is a so-called in-ground storm shelter. These storm shelters are placed below ground grade and typically afford the most significant level of protection for the occupants of the storm shelter.

The prior art related to in-ground storm shelters have had a number of deficiencies. The limitations include without limitation the operation of the door that allows ingress and egress from the storm shelter. In particular some of the doors are particularly heavy and difficult to open. It is evident that it is important for the storm shelter door to remain securely closed in the event of a tornado so that the occupants of the storm shelter are afforded the maximum level of safety. The maximum level of safety is due both to the possibility of occupants of the storm shelter being drawn out of the storm shelter due to the high winds of the tornado as well as debris making its way into the storm shelter. Therefore it is very important for any door to be securely closed as the occupants of the storm shelter require.

SUMMARY OF THE EMBODIMENTS

The embodiments of the In-Ground Storm Shelter are comprised of a bottom, a left side and a right side. The In-Ground Storm Shelter is further comprised of a front side and a back side, and a top side. The top side is further comprised of a removable back door, a sliding door, a top left shoulder and a top right shoulder. The top left shoulder and top right shoulder when installed in the ground are just below the grade of the surface and are commonly covered with concrete. The top left shoulder and top right shoulder therefore serve to maintain the position of the various embodiments of the Ground Storm Shelter.

The left and right sides are further comprised of a "V" shaped side ribs. The purpose of the V shape fold is to further secure the embodiment in the ground or concrete when concrete or soil is placed around the embodiment. When the concrete or soil is compacted or the concrete is hardened the V-shaped side ribs structures prevent the embodiment from moving relative to the surface of the ground. The bottom lip of the storm shelter acts in a similar way to the V-shaped side ribs to prevent the storm shelter from shifting position vertically when soil is compacted on top of the bottom lip or concrete is poured and cured on top of the bottom lip.

In this respect, it is to be understood that the embodiments in this application are not limited to the details of construction and to the arrangements of the components set forth in the description or illustrated in the drawings. The embodiments are capable of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the embodiments described in this application. Additional benefits and advantages of the present embodiments will become apparent in those skilled in the art to which the embodiments relate from the description of the preferred embodiment and the appended claims, taken in conjunction with the accompanying drawings. It is important, therefore, that the claims be regarded as including such equivalent constructions insofar as they do not depart from the spirit and scope of the embodiments described herein.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE PREFERRED EMBODIMENTS

Figure 1:
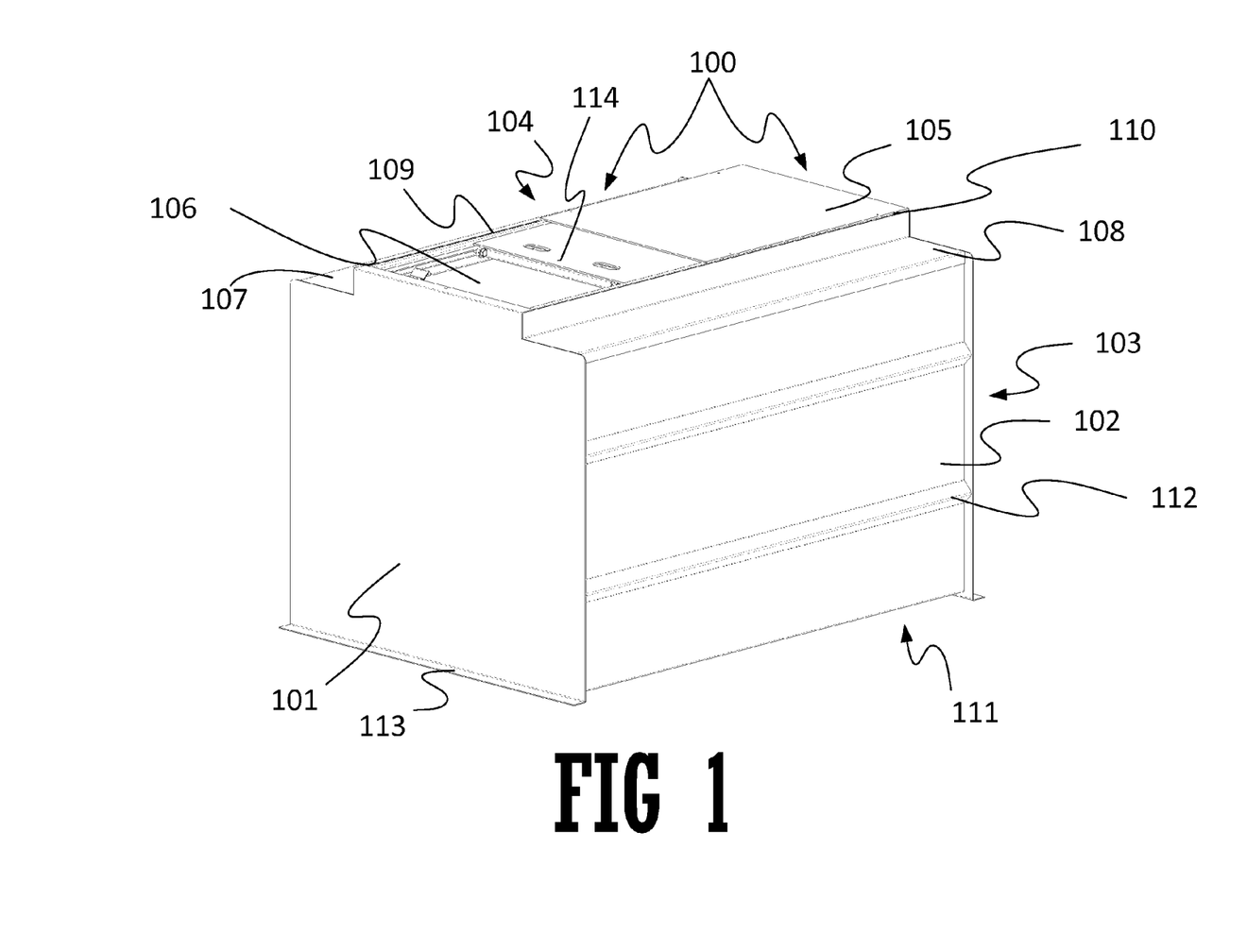
FIG. 1 is an isometric drawing showing the various embodiments of the In-Ground Storm Shelter.
Figure 2:
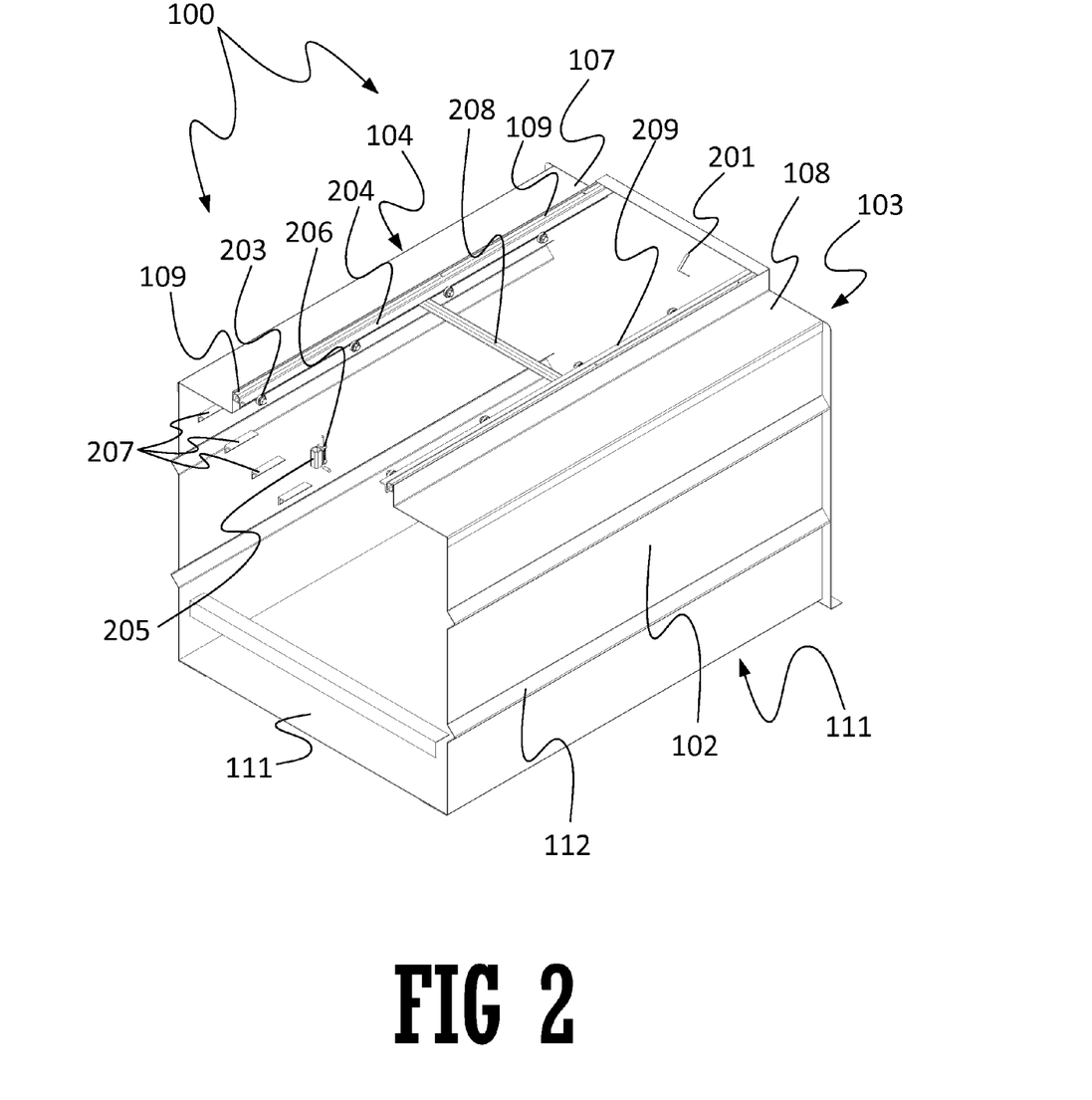
FIG. 2 is an isometric cutaway drawing showing the internal structural and functional elements of the embodiments of the In-Ground Storm Shelter with both doors removed for clarity.
Figure 3A:
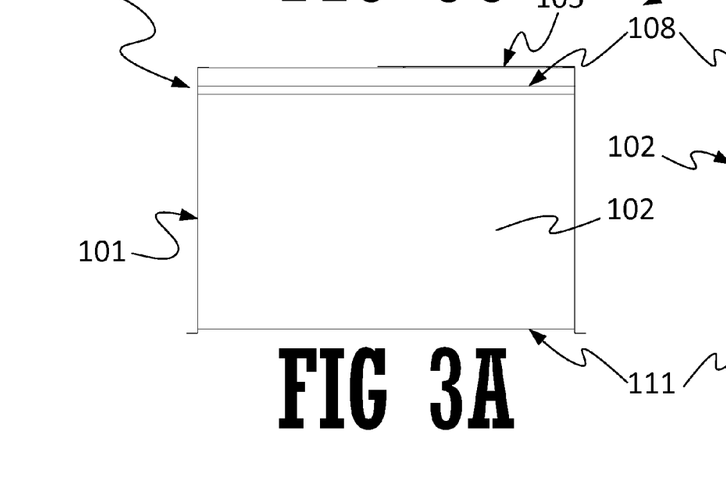
FIG. 3A is a side view of an embodiment of the In-Ground Storm Shelter.
Figure 3B:
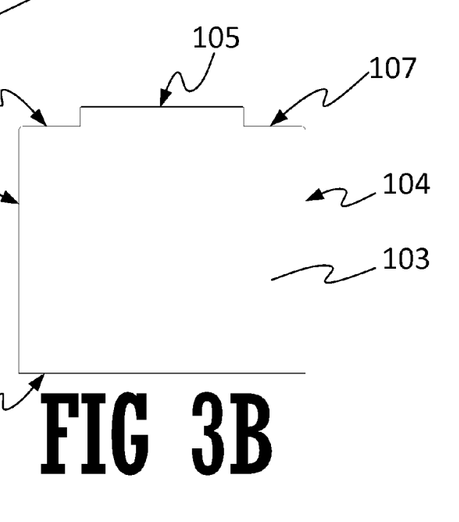
FIG. 3B is a back view of the embodiments of the In-Ground Storm Shelter.
Figure 3C:
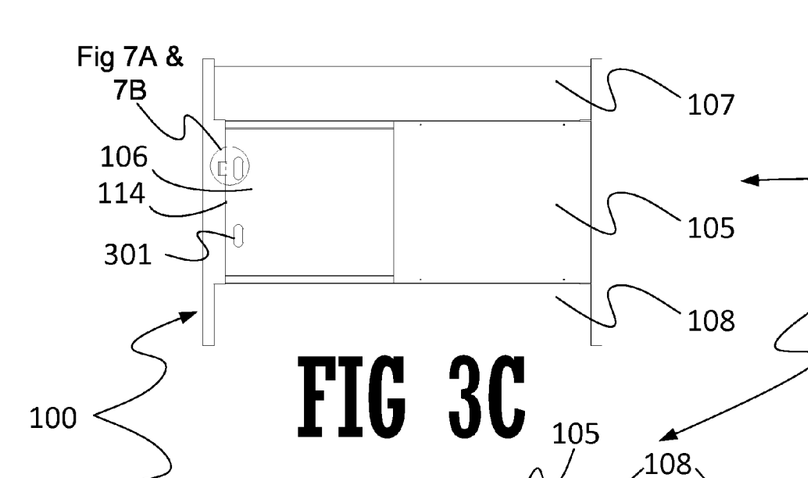
FIG. 3C is a top view of embodiments of the In-Ground Storm Shelter showing the sliding door closed.
Figure 4A:
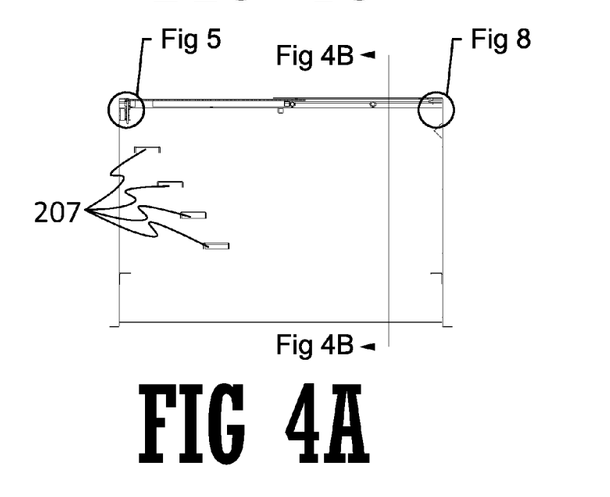
FIG. 4A is a cutaway section side view of the In-Ground Storm Shelter.
Figure 4B:
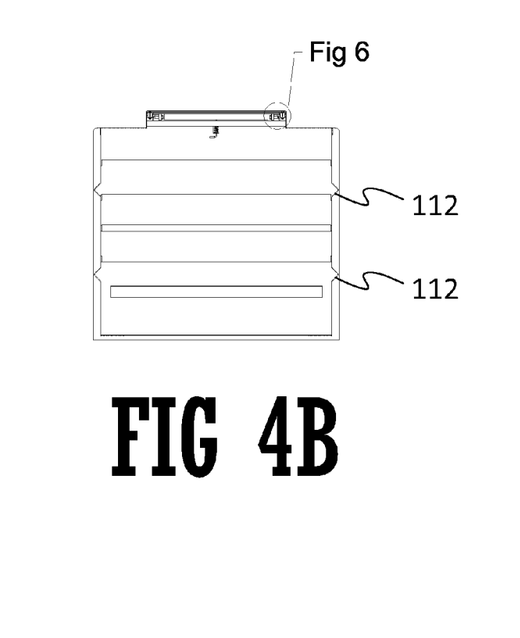
FIG. 4B is a cutaway back view of embodiments of the In-Ground Storm Shelter.
Figure 4C:
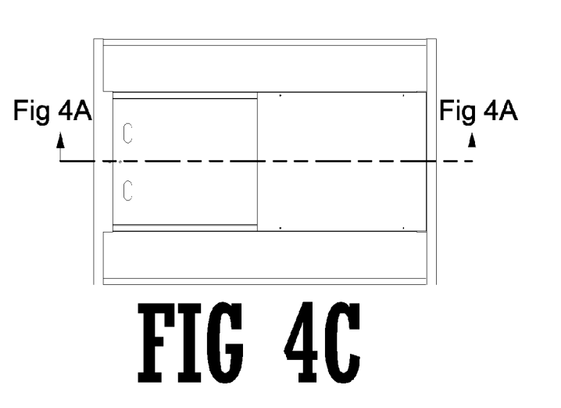
FIG. 4C is a top view of the embodiments of the In-Ground Storm Shelter.

The embodiments of the In-Ground Storm Shelter 100 are comprised of a bottom 111, a left side 104 and a right side 102. The In-Ground Storm Shelter 100 is further comprised of a front side 101 and a back side 103, and a top side.

The top side is further comprised of a removable back door 105, a sliding door 106, a top left shoulder 107 and a top right shoulder 108. The top left shoulder 107 and top right shoulder 108 when installed in the ground are just above the grade of the surface and are commonly surrounded with concrete. The top left shoulder 107 and top right shoulder 108 therefore serve to maintain the position of the various embodiments of the in-Ground Storm Shelter.

The left 104 and right 102 sides are further comprised of a plurality of V-crimped side ribs 112. The purpose of the V shape fold is to further secure the embodiment in the ground or concrete when concrete or soil is placed around the embodiment. When the concrete or soil is compacted or the concrete is hardened the V-crimped side ribs 112 structures prevent the embodiment from popping out of the ground, and pushing in the side walls. The bottom lip 113 of the storm shelter acts in a similar way to the V-crimped side ribs 112 to prevent the storm shelter from shifting position vertically when soil is compacted on top of the bottom lip 113 or concrete is poured and cured on top of the bottom lip.

The removable back door 105 and sliding door 106 serve as the means of egress and ingress of the storm shelter. When the sliding door 106 is in the closed position it forms a tight seal against any debris or wind. When the sliding door 106 is in the closed position the sliding door 106 is secured by a locking means. The sliding door is further comprised of a mechanism that allows the sliding door to slide underneath the removable back door 105.

Figure 8:
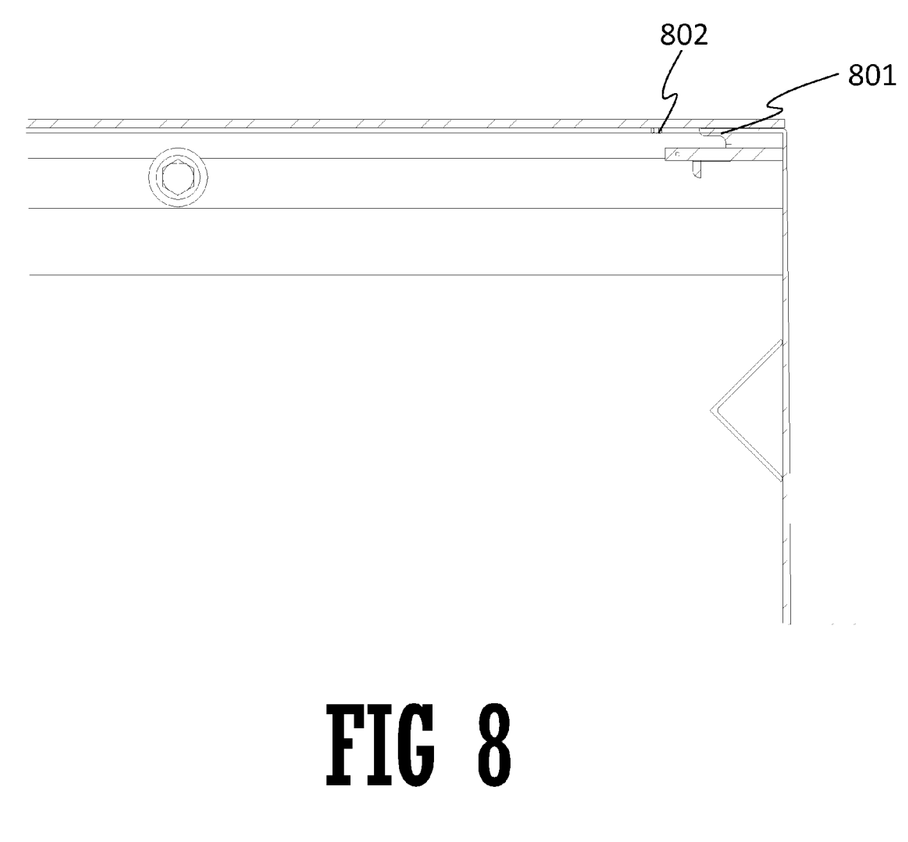
FIG. 8 is a sectional view showing how the removable back door is affixed to the In-Ground Storm Shelter.

The removable back door 105 is supported by a rear angle iron flange 801 affixed to the interior of the In-Ground Storm Shelter and affixed to the a top left shoulder 107 and a top right shoulder 108 by a plurality of bolts 802 accessible from the interior of the In-Ground Storm Shelter. Therefore, if it becomes necessary, the occupants of the In-Ground Storm Shelter may exit by simply removing the bolts 802 and removing the removable back door 105 to gain an exit to ground level. Therefore in this embodiment, the occupant of the in-ground storm shelter can remove the removable back door an exit through the opening once occupied by the removable back door.

The sliding mechanism is comprised of a left and right door track. The left and right door tracks are further comprised of a sliding door track tube (the sliding door track tube on the left 109 is shown and on the right 110) and a left sliding door track angle 204 and a right sliding door track angle 209. The left and right door tracks are affixed with a top cross support 208.

The top cross supported is affixed to the left and right door tracks via a welded connection and serves to provide structural support. Welded to the door track angles are a plurality of rollers 203. The door tracks are arranged so that the sliding door 106 slides under the removable back door 105 when opened. The plurality of rollers 203 allow the sliding door 106 to slide with minimal effort underneath the removable back door 105. The view shown in FIG. 2 shows the left side door track and the right side door track is a mirror image of the left side door track. All components of the embodiments of the In-Ground Storm shelter are manufactured from steel.

Figure 6:
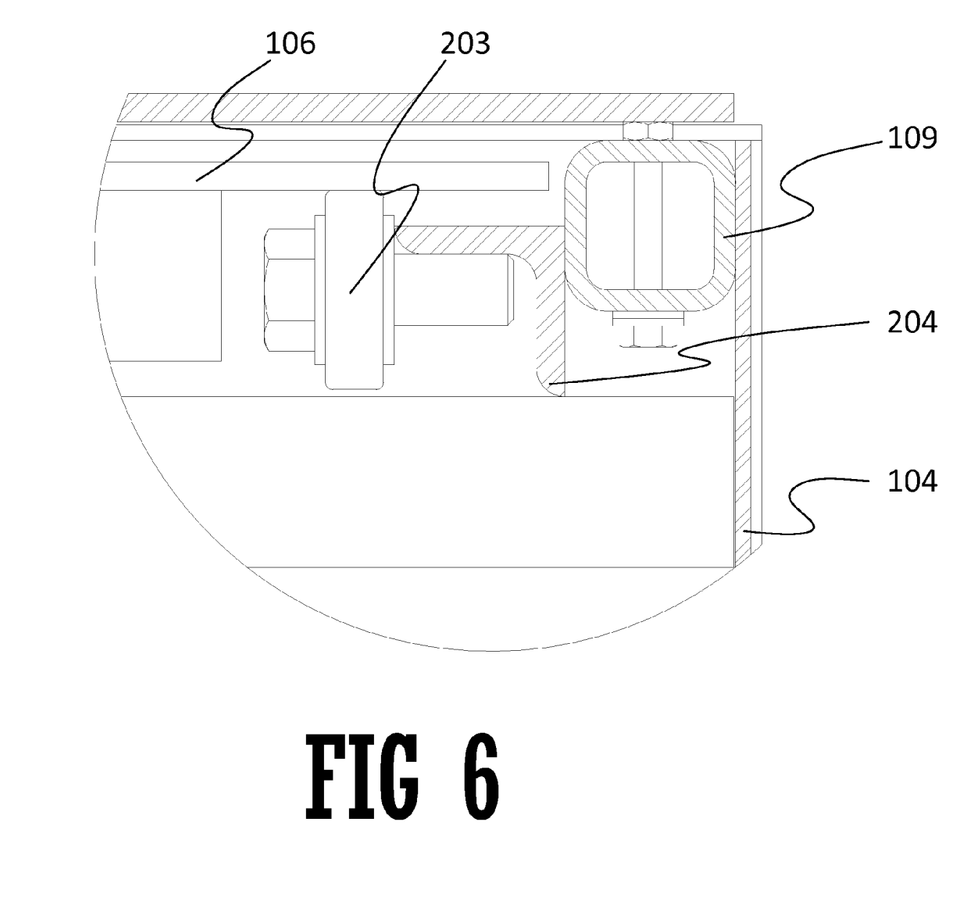
FIG. 6 is a detailed view showing the rollers which guide the sliding door of embodiments of the In-Ground Storm Shelter.
Figure 7A:
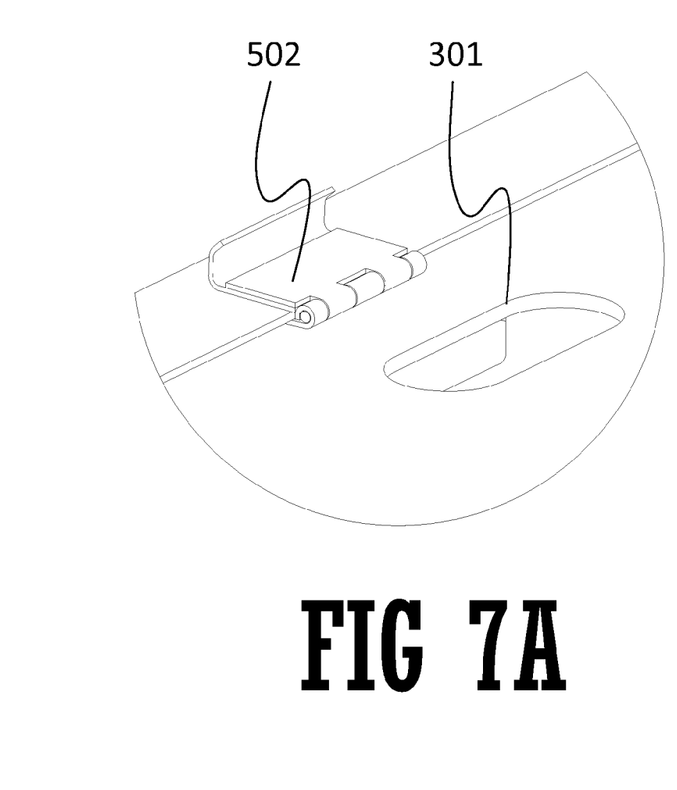
FIG. 7A is an expanded view of the latch in the open position.
Figure 7B:
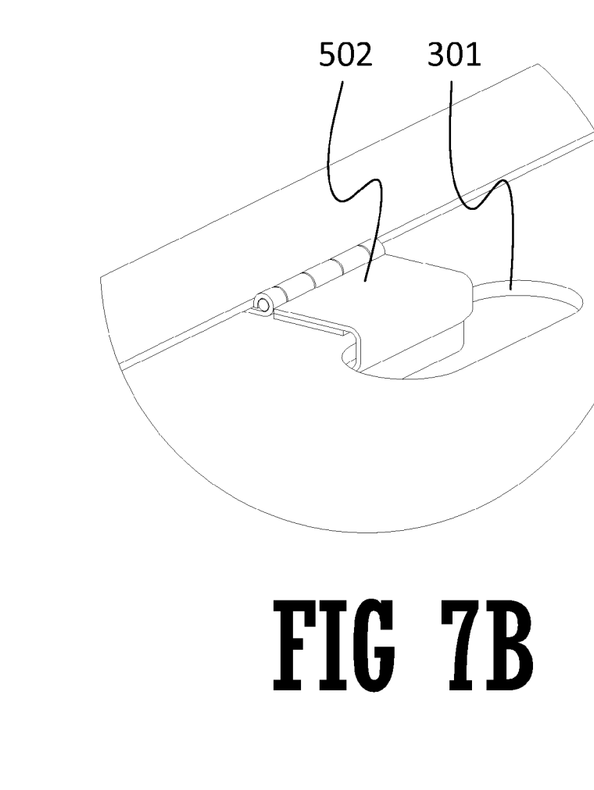
FIG. 7B is an expanded view of the latch in the closed or engaged position.

As is shown in detail in FIG. 6, one of the plurality of rollers 203 is welded to the sliding door track angle 204. As shown in this figure, the sliding door 106 rests upon the plurality of rollers 203 (illustrated in FIG. 6 as resting upon one of the rollers). This arrangement allows for the sliding door to be easily opened and closed with minimal effort.

Figure 5:
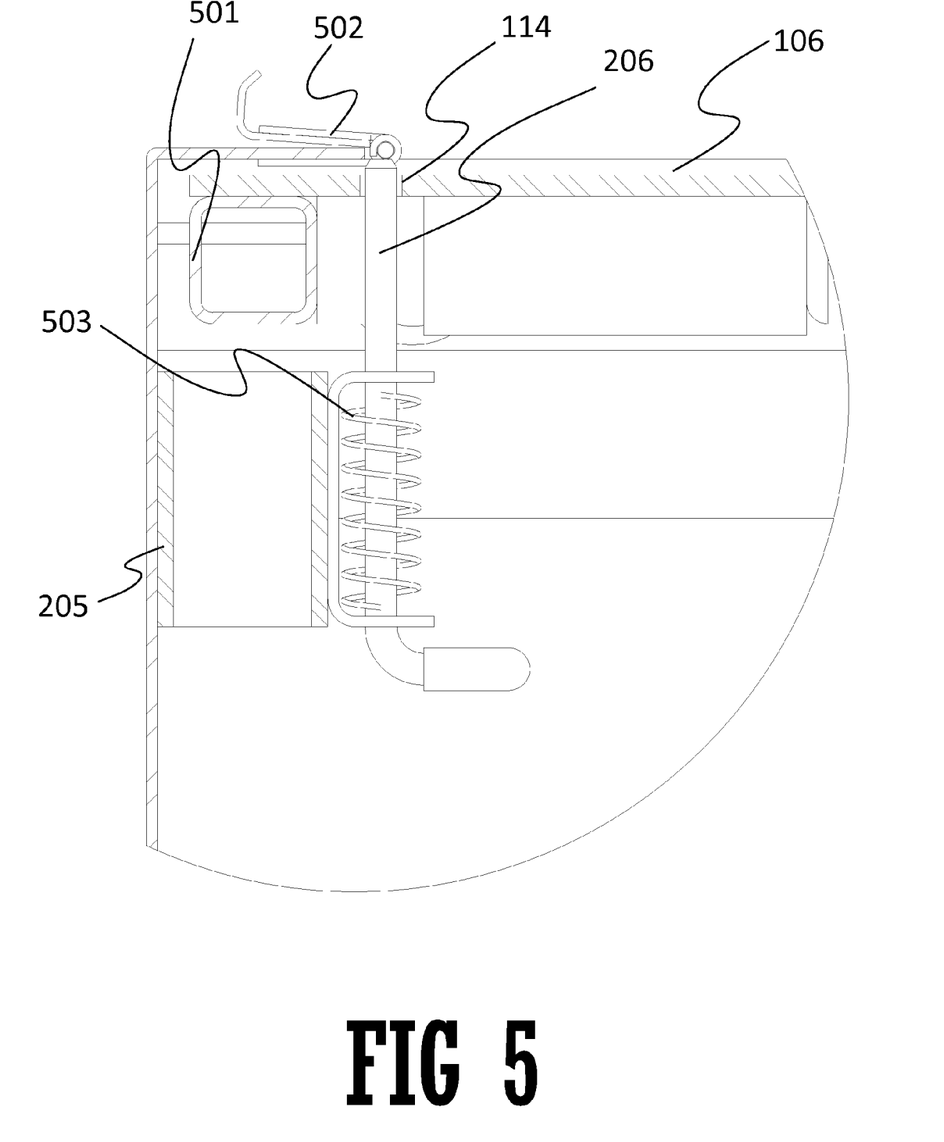
FIG. 5 is a detailed view showing an embodiment of the locking means as it would engage in the sliding door of embodiments of the In-Ground Storm Shelter.

In an embodiment of the In-Ground Storm Shelter 100, the locking means to secure the sliding door 106 is comprised of a sliding door locking pin tube 205 and a sliding door locking pin 206. The sliding door locking pin 206 is comprised of an "L" shaped pin that allows the door to be locked. The pin is engaged by the occupant of the In-Ground Storm Shelter 100 into an aperture formed in the front support tube 501 affixed to the sliding door 106 via a weld. The sliding door locking pin 206 is engaged as the sliding door 106 is placed in the closed position. The locking means is further comprised of a spring-loaded mechanism 503 so that as the sliding door is slid over the mechanism the spring-loading mechanism 503 easily inserts the pin into the aperture formed by the sliding door. Embodiments of the In-Ground Storm Shelter 100 also comprise a latch 502 that, when engaged into an aperture 301 formed by the sliding door 106, secures the sliding door 106 in the closed position.

In an embodiment of the In-Ground Storm Shelter 100, the locking means to secure the sliding door 106 is comprised of a sliding door locking pin tube 205 and a sliding door locking pin 206. The sliding door locking pin 206 is comprised of an "L" shaped pin that allows the door to be locked. The sliding door locking pin 206, which is affixed to the front support tube 501 via a weld, is engaged by the occupant of the In-Ground Storm Shelter 100 into an aperture 114 formed in the sliding door 106. The sliding door locking pin 206 is engaged as the sliding door 106 is placed in the closed position. The locking means is further comprised of a spring-loaded mechanism 503 so that as the sliding door is slid over the mechanism the spring-loading mechanism 503 easily inserts the pin into the aperture 114 formed by the sliding door. Embodiments of the In-Ground Storm Shelter 100 also comprise a latch 502 that, when engaged into an aperture 301 formed by the sliding door 106, secures the sliding door 106 in the closed position Internal to the In-Ground Storm Shelter 100 are several features that assist in the usability of the In-Ground Storm Shelter 100. An angle iron 201 is welded onto the inside of the In-Ground Storm Shelter 100 in the event that the sliding door becomes jammed by debris. A winch or other prying means can be attached to the angle iron 201 and the underside of the sliding door to force the door open. A plurality of step supports 207 are welded to the inside of the right side 102 and the inside of the left side 104. The step supports 207 are essentially metal angles that allow for placement of steps for ingress and egress of the In-Ground Storm Shelter 100.

In the best mode of operation of the embodiments of the In-Ground Storm Shelter, earth is removed from the location of installation of the In-Ground Storm Shelter and the In-Ground Storm Shelter is installed into the below-ground location such that the top left shoulder and top right shoulder are just below the grade of the surface. Then concrete is poured around the embodiments to cover the bottom lip, the V-shaped side ribs structures, and the top shoulders. This concrete serves to secure the In-Ground Storm Shelter in place. When the user requires use of the shelter, they first open the latch 502 to disengage the sliding door 106. Next, the user slides the sliding door 106 open and enters the In-Ground Storm Shelter via the steps installed onto the step supports 207. Next, the user slides the sliding door 106 closed. When the sliding door 106 is closed, the locking means secures the sliding door 106 closed. In one embodiment, the user engages a locking pin tube 205 and a sliding door locking pin 206 into an aperture thereby securing the sliding door 106 closed.

What is claimed is:

1. An in-ground storm shelter comprised of a sliding door, a bottom, a left side, a right side, a front side, a back side, a top side, and a removable back door, wherein the sliding door is supported in a manner such that when the sliding door is in the open position the sliding door is positioned under the removable back door, wherein the removable back door is supported by a rear angle iron flange and affixed to the top of the in-ground storm shelter by a plurality of bolts accessible from the interior of the in-ground storm shelter, wherein the plurality of bolts are located completely interior to the in-ground storm shelter such that the occupant of the in-ground storm shelter can remove the removable back door by removing the plurality of bolts and the removable back door and exiting through the opening once occupied by the removable back door.

2. The in-ground storm shelter described in claim 1 wherein the bottom forms a bottom lip.

3. The in-ground storm shelter described in claim 1 wherein the sliding door is secured in the closed position by a locking means to secure the sliding door.

4. The in-ground storm shelter described in claim 1 wherein the locking means to secure the sliding door is comprised of
   a sliding door locking pin tube;
   a sliding door locking pin;
      wherein the sliding door locking pin is comprised of an "L" shaped pin that allows the door to be locked; and
      wherein the pin is engaged by the user as the sliding door is placed in the closed position and secures the door in the closed position;
   a spring-loaded mechanism so that as the sliding door is slid over the mechanism the spring-loading mechanism secures the door in the closed position.

5. An in-ground storm shelter comprised of a sliding door, a bottom, a left side, a right side, a front side, a back side, a top side, and a removable back door, wherein the removable back door is supported by a rear angle iron flange and affixed to the top of the in-ground storm shelter by a plurality of bolts accessible from the interior of the in-ground storm shelter, wherein the plurality of bolts are located completely interior to the in-ground storm shelter such that the occupant of the in-ground storm shelter can remove the removable back door by removing the plurality of bolts and the removable back door and exiting through the opening once occupied by the removable back door.

6. The in-ground storm shelter described in claim 5 wherein the bottom forms a bottom lip.

7. The in-ground storm shelter described in claim 5 wherein the sliding door is secured in the closed position by a locking means to secure the sliding door.

8. The in-ground storm shelter described in claim 5 wherein the locking means to secure the sliding door is comprised of
   a sliding door locking pin tube;
   a sliding door locking pin;
      wherein the sliding door locking pin is comprised of an "L" shaped pin that allows the door to be locked; and
      wherein the pin is engaged by the user as the sliding door is placed in the closed position and secures the door in the closed position;
   a spring-loaded mechanism so that as the sliding door is slid over the mechanism the spring-loading mechanism secures the door in the closed position.

9. An in-ground storm shelter comprised of a sliding door, a bottom, a left side, a right side, a front side, a back side, a top side, and a removable back door, wherein the sliding door is supported in a manner such that when the sliding door is in the open position the sliding door is positioned under the removable back door, wherein the removable back door is affixed to the top of the in-ground storm shelter by a plurality of fasteners accessible from the interior of the in-ground storm shelter, wherein the plurality of fasteners are located completely interior to the in-ground storm shelter such that the occupant of the in-ground storm shelter can remove the removable back door by removing the plurality of fasteners and the removable back door and exiting through the opening once occupied by the removable back door.

10. The in-ground storm shelter described in claim 9 wherein the bottom forms a bottom lip.

11. The in-ground storm shelter described in claim 9 wherein the sliding door is secured in the closed position by a locking means to secure the sliding door.

12. The in-ground storm shelter described in claim 9 wherein the locking means to secure the sliding door is comprised of
   a sliding door locking pin tube;
   a sliding door locking pin;
      wherein the sliding door locking pin is comprised of an "L" shaped pin that allows the door to be locked; and
      wherein the pin is engaged by the user as the sliding door is placed in the closed position and secures the door in the closed position;
   a spring-loaded mechanism so that as the sliding door is slid over the mechanism the spring-loading mechanism secures the door in the closed position.

13. An in-ground storm shelter comprised of a sliding door, a bottom, a left side, a right side, a front side, a back side, a top side, and a removable back door, wherein the removable back door is affixed to the top of the in-ground storm shelter by a plurality of bolts accessible from the interior of the in-ground storm shelter, wherein the plurality of bolts are located completely interior to the in-ground storm shelter such that the occupant of the in-ground storm shelter can remove the removable back door by removing the plurality of bolts and the removable back door and exiting through the opening once occupied by the removable back door.

14. The in-ground storm shelter described in claim 13 wherein the bottom forms a bottom lip.

15. The in-ground storm shelter described in claim 13 wherein the sliding door is secured in the closed position by a locking means to secure the sliding door.

16. The in-ground storm shelter described in claim 13 wherein the locking means to secure the sliding door is comprised of
   a sliding door locking pin tube;
   a sliding door locking pin;

wherein the sliding door locking pin is comprised of an "L" shaped pin that allows the door to be locked; and
wherein the pin is engaged by the user as the sliding door is placed in the closed position and secures the door in the closed position;
a spring-loaded mechanism so that as the sliding door is slid over the mechanism the spring-loading mechanism secures the door in the closed position.

\* \* \* \* \*